(12) United States Patent
Cho

(10) Patent No.: US 8,069,316 B2
(45) Date of Patent: Nov. 29, 2011

(54) COMPUTER SYSTEM, CONTROL METHOD THEREOF AND DATA PROCESSING APPARATUS

(75) Inventor: Jeong-bae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 12/174,976

(22) Filed: Jul. 17, 2008

(65) Prior Publication Data

US 2009/0063791 A1    Mar. 5, 2009

(30) Foreign Application Priority Data

Aug. 28, 2007   (KR) .................. 10-2007-0086423

(51) Int. Cl.
*G06F 12/00*   (2006.01)
(52) U.S. Cl. .................................... 711/154; 365/227

(58) Field of Classification Search .............. 711/154; 365/227
See application file for complete search history.

(56) References Cited

U.S. PATENT DOCUMENTS 4,133,030 A * 1/1979 Huettner et al. ............ 710/1
2007/0288783 A1* 12/2007 Ogasawara et al. ......... 713/323

FOREIGN PATENT DOCUMENTS

JP    7-129287     5/1995
KR    1999-73440   10/1999

* cited by examiner

*Primary Examiner* — Hashem Farrokh
(74) *Attorney, Agent, or Firm* — Jefferson IP Law, LLP

(57) ABSTRACT

A computer system and a method of controlling a computer system, the computer system including: a first memory corresponding to a first channel and a second memory corresponding to a second channel; a data processor to process the data of the first and second channels in a time division manner; and a controller to inactivate the second channel if an amount of the data processed by the data processor is less than or equal to a predetermined value.

30 Claims, 3 Drawing Sheets

COMPUTER SYSTEM, CONTROL METHOD THEREOF AND DATA PROCESSING APPARATUS

CROSS-REFERENCE TO RELATED APPLICATION

This application claims the benefit of Korean Application No. 2007-86423, filed Aug. 28, 2007, in the Korean Intellectual Property Office, the disclosure of which is incorporated herein by reference.

BACKGROUND OF THE INVENTION

1. Field of the Invention

Aspects of the present invention relate to a computer system, a control method thereof and a data processing apparatus, and more particularly, to a computer system that includes a plurality of memories corresponding to a plurality of channels, a control method thereof and a data processing apparatus.

2. Description of the Related Art

A computer system (such as a desktop computer, a laptop computer, and a mobile terminal) includes a memory (such as a RAM) to temporarily store processed data. The memory includes a main memory to read and write data processed by a main processor controlling the computer system (such as a central processing unit (CPU)), and a graphic memory to read and write graphic data processed by a graphic processor.

As users demand higher graphic quality, a graphic memory having a larger capacity is required. However, such a demand can also be accomplished by connecting a plurality of graphic memories. For example, two 64-bit graphic memories can be connected in parallel to thereby read and write data at a rate of 128 bits.

The graphic processor may include a graphic core that processes data to be read or written by a plurality of graphic memories. Specifically, the graphic core may process data of a plurality of channels, corresponding to the plurality of graphic memories, in a time division manner. Compared other types of data processing methods, in the time division manner, the graphic core consumes large amounts of power since the graphic core processes the data several times faster than the reading and writing speed of the graphic memory.

In a conventional computer system, however, the combined bandwidth of all channels (i.e., the bit rate of the processed data) is always fixed regardless of the amount of data to be processed. In reality, the amount of data to be processed, however, is not always the same. In some cases, a large amount of data may be processed (such as with 3D images), while in other cases, a small amount of data may be processed (such as with text). Furthermore, the amount of data to be processed may be rarely used (such as entering a screen saver mode, turning off a monitor, etc.).

If the large amount of data is to be processed, all of the channels normally operate to process the data as soon as possible. However, if all of the channels are used to process the small amount of data or the rare amount thereof, the processing would be inefficient and a waste of power. As described above, if the graphic core unnecessarily operates at a fast speed even though the amount of the data to be processed is small, the graphic core would be wasting power to the detriment of power saving measures. Particularly, studies have been implemented to reduce power consumption and extend battery usage time in a mobile computer system (such as a laptop computer). Considering such a recent trend, the unnecessary power consumption should be addressed.

Korean Patent First Publication No. 1999-0073440 discloses a mobile computer system that supplies only power to a memory that is necessary for operating software, and cuts off unnecessary power to the memory. However, the bandwidth of memory channels is not changed, and the unnecessary power consumption due to the graphic core is not addressed.

The graphic processor further includes a plurality of channel controllers that exchanges data of channels with respect to the plurality of graphic memories. In the conventional computer system, the plurality of channel controllers receives power and operates regardless of the amount of data to be processed. The plurality of channel controllers continuously receives power even when the plurality of channel controllers does not have a large amount of data to be processed. This continuous supply of power is another cause of unnecessary power consumption. Furthermore, the plurality of graphic memories unnecessarily wastes power in addition to the plurality of the channel controllers.

SUMMARY OF THE INVENTION

Aspects of the present invention provide a computer system that minimizes a power consumption to process data of a plurality of channels, a control method thereof and a data processing apparatus.

According to an aspect of the present invention, there is provided a computer system, including: a first memory corresponding to a first channel and a second memory corresponding to a second channel, to store data; a data processor to process the data of the first and second channels; and a controller to inactivate the second channel if an amount of the data processed by the data processor is less than or equal to a predetermined value.

The controller may transmit the data of the inactivated second channel to the first memory.

The computer system may further include first and second channel controllers corresponding to the first and second channels and respectively providing an interface between the first and second memories and the data processor; and a first power supply unit to supply power to the first and second channel controllers, wherein the controller controls the first power supply unit to not supply power to the second channel controller when the second channel is inactivated.

The computer system may further include a second power supply unit to supply power to the first and second memories, wherein the controller may control the second power supply unit to not supply power to the second memory when the second channel is inactivated.

The controller may recover the second channel if the amount of the data processed by the data processor becomes greater than the predetermined value.

The controller may transmit a portion of the data from the first memory to the second memory when the second channel is recovered.

The computer system may further include first and second channel controllers corresponding to the first and second channels and respectively providing an interface between the first and second memories and the data processor; and a first power supply unit to supply power to the first and second channel controllers, wherein the controller may control the first power supply unit to not supply power to the second channel controller if the second channel is inactivated, and to supply power back to the second channel controller if the second channel is recovered.

The computer system may further include a second power supply unit to supply power to the first and second memories, wherein the controller may control the second power supply unit to not supply power to the second memory if the second channel is inactivated.

According to another aspect of the present invention, there is provided a control method of a computer system, the control method including: measuring an amount of processed data of first and second channels corresponding to first and second memories storing data; and inactivating the second channel if the amount of the data is less than or equal to a predetermined value.

The inactivating the channel may include transmitting the data of the inactivated second channel to the first memory.

The control method may further include cutting off power supplied to a second channel controller corresponding to the inactivated second channel.

The control method may further include cutting off power supplied to the second memory when the second channel is inactivated.

The control method may further include measuring the amount of processed data after the second channel is inactivated; and recovering the second channel if the amount of the measured data is greater than the predetermined value.

The recovering of the inactivated channel may include transmitting a portion of the data stored in the first memory to the second memory.

The control method may further include cutting off power supplied to a second channel controller corresponding to the second channel if the second channel is inactivated; and supplying power back to the second channel controller if the second channel is recovered.

The control method may further include cutting off power supplied to the second memory if the second channel is inactivated; and supplying the power back to the second memory if the second channel is recovered.

According to yet another aspect of the present invention, there is provided a data processing apparatus, including: a data processor to process data of first and second channels corresponding to first and second memories; and a controller to inactivate the second channel if the amount of the data processed by the data processor is less than or equal to a predetermined value.

According to still another aspect of the present invention, there is provided a method of controlling a power supply in a computer system including a first memory corresponding to a first channel and a second memory corresponding to a second channel, the method including: cutting off a power of the second channel if an amount of data, of the first and second channels, that is processed is less than or equal to a predetermined value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
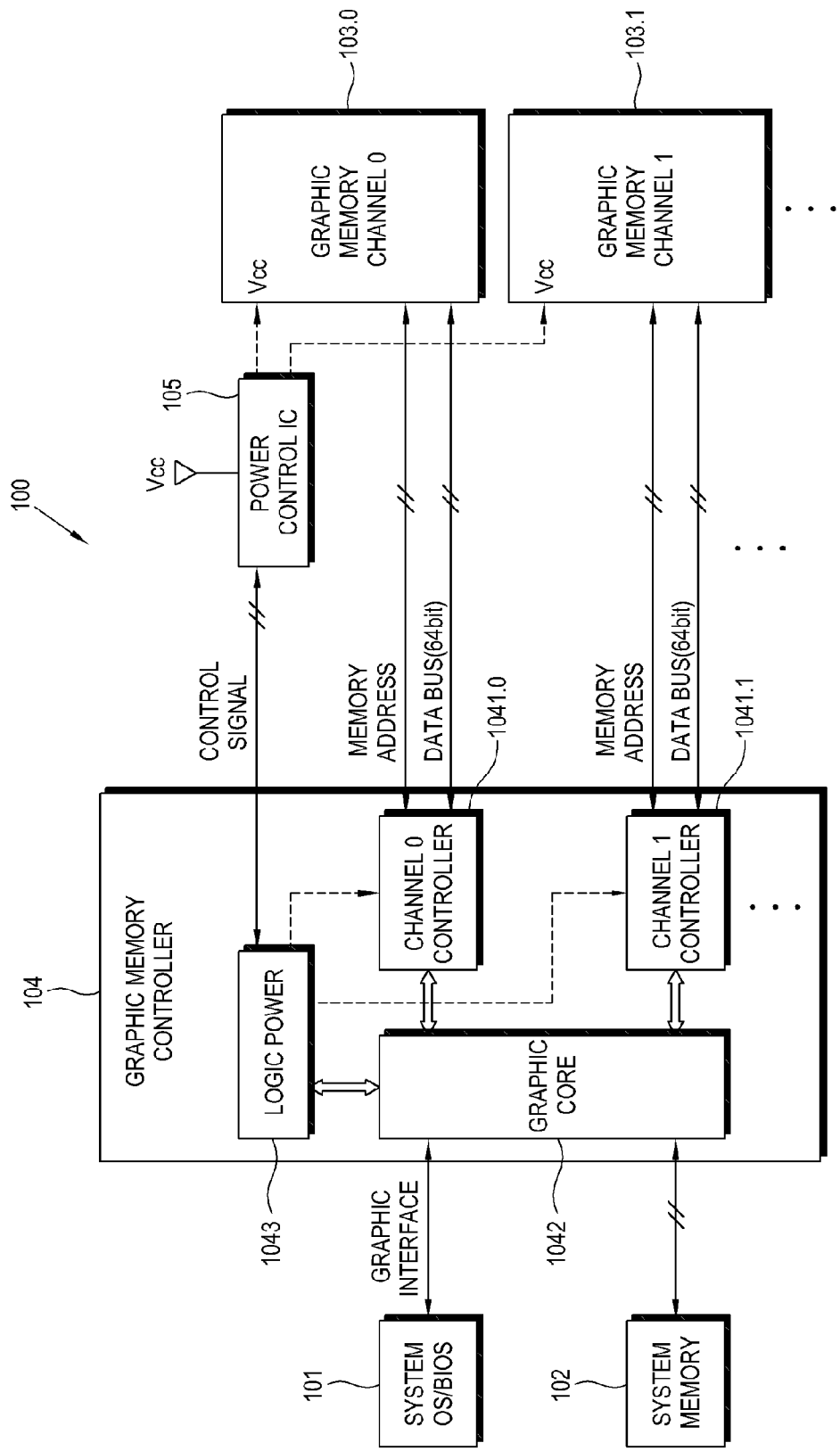
FIG. 1 is a block diagram of a computer system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a computer system 100 according to an embodiment of the present invention. Referring to FIG. 1, the computer system 100 (which, for example, may be a desktop computer, a laptop computer, a mobile phone, etc.) includes a system OS/BIOS 101 and a system memory 102 (such as a RAM).

The system OS/BIOS 101 includes a main processor (not shown) to execute a program code loaded to the system memory 102, and executes an operating system (OS) and a basic input/output system (BIOS). The computer system 100 may further include an HDD (hard disk drive) (not shown) or a ROM, which is a non-volatile memory storing a program code to execute the OS and BIOS. The computer system 100 may even further include a memory controller hub (MCH) (not shown), which is an interface between the system OS/BIOS 101 and the system memory 102, peripherals (not shown) such as a keyboard, a mouse, a sound card and a network card, and an input/output controller hub (ICH) (not shown) as an interface between the peripherals and the system OS/BIOS 101. It is understood that the computer system 100 may include still more components than those listed above.

As shown in FIG. 1, the computer system 100 further includes a plurality of graphic memories (a graphic memory channel 0 103.0 and a graphic memory channel 1 103.1) corresponding to a plurality of channels. Each of the graphic memory channels 0 and 1 103.0 and 103.1 includes an inherent memory address and a data channel. That is, the graphic memory channels 0 103.0 and 1 103.1 store graphic data of the channels 0 and 1, respectively. The graphic data, according to the present embodiment, includes not only data of graphic images, but also additional data generated during graphic processing.

The graphic memory channel 0 103.0 and the graphic memory channel 1 103.1 may include a RAM, although aspects of the present invention are not limited thereto. Furthermore, the graphic memory channel 0 103.0 and the graphic memory channel 1 103.1 are an example of memory in the present embodiment. However, it is understood that aspects of the present invention are not limited thereto. For example, alternatively, the computer system 100 may include three or more memories.

The computer system 100 further includes a graphic memory controller 104. The graphic memory controller 104 includes a channel 0 controller 1041.0, a channel 1 controller 1041.1, and a graphic core 1042 that processes graphics data. The channel 0 controller 1041.0 and the channel 1 controller 1041.1 correspond to the graphic memory channel 0 103.0 and the graphic memory channel 1 103.1, respectively. The graphic memory controller 104 may include a single element (such as a graphic chip), although aspects of the present invention are not limited thereto.

The channel 0 controller 1041.0 and the channel 1 controller 1041.1 communicate with the graphic memory channel 0 103.0 and the graphic memory channel 1 103.1 in parallel, according to a control of the graphic core 1042. Address lines and data buses are provided between the channel 0 controller 1041.0 and the graphic memory channel 0 103.0, and between the channel 1 controller 104.1 and the graphic memory channel 1 103.1. The address lines transmit memory addresses and the data buses transmit data. Each data bus may have a 64-bit bandwidth, and the bandwidth of the two channels (channels 0 and 1) may total 128 bits, although aspects of the present invention are not limited thereto.

The graphic core 1042 processes graphics data according to a command from the system OS/BIOS 101. The graphic core 1042 reads data from the graphic memory channels 0 and 1 103.0 and 103.1 or writes data to the graphic memory channels 0 and 1 103.0 and 103.1 to process the graphics data. To read and write data with respect to the graphic memory channels 0 and 1 103.0 and 103.1, the graphic core 1042 controls the channel 0 controller 1041.0 and the channel 1 controller 1041.1. It is understood that the graphic core 1042 is only an example of a combination of a data processor and a controller according to aspects of the present invention.

The data processed by the graphic core 1042 may be divided into two parts to be respectively supplied to two channels. For example, if the entire bandwidth of the processed data is 128 bits, the upper 64-bit data of the 128-bit data may be allocated to the channel 0, and the lower 64-bit data of the 128-bit data may be allocated to the channel 1. The graphic core 1042 may process both the upper 64-bit data and the lower 64-bit data in a time division manner, whereby the upper 64-bit data and the lower 64-bit data are transmitted in parallel by the channel 0 controller 1041.0 and the channel 1 controller 1041.1, respectively.

The graphic core 1042 reduces or recovers the channels depending on the amount of processed data. For example, if the amount of the processed data decreases to a predetermined value or lower, the graphic core 1042 may use only the channel 0 for the upper 64-bit data among the channels 0 and 1. According to aspects of the present invention, the predetermined value may be determined in consideration of the processing speed of the graphic core 1042, within a range not affecting graphic performance even if the channel 0 is used alone.

If the amount of the processed data is the predetermined value or lower, (for example, if texts are processed or if the computer system 100 enters a screen saver mode), the operation speed of the graphic core 1042 is reduced from, for example, a 128 bit rate to a 64 bit rate to thereby minimize any unnecessary operation of the graphic core 1042 and save power consumption.

More specifically, the graphic core 1042 according to the present embodiment stops operation of the channel 1 controller 1041.1 so as to not use the channel 1. In this case, the graphic memory controller 104 further includes a logic power 1043 to supply power to the channel 0 controller 1041.0 and the channel 1 controller 1041.1. The graphic core 1042 controls the logic power 104 to not supply power to the channel 1 controller 1041.1. As power that is supplied to the channel 1 controller 1041.1 (which is not used after reducing the channels) is cut off, unnecessary power consumption is minimized to further reduce power consumption. The logic power 1043 is an example of a first power supply unit, although aspects of the present invention are not limited thereto.

According to another embodiment, if the channel 1 is inactivated, the graphic core 1042 reconfigures the data of the channel 0 to include the data of the inactivated channel 1. For example, if the channel 1 is inactivated, the graphic core 1042 transmits a reduction command of the channel 1 to the channel 0 controller 1041.0 and the channel 1 controller 1041.1.

According to the reduction command of the graphic core 1042, the channel 0 controller 1041.0 and the channel 1 controller 1041.1 allocate the memory address of the graphic memory channel 0 103.0 to the data of the channel 1 stored in the graphic memory channel 1 103.1, and transmit the data of the channel 1 to the graphic memory channel 0 103.0. That is, the data is directly transmitted from the graphic memory channel 1 103.1 to the graphic memory channel 0 103.0 through the channel 0 controller 1041.0 and the channel 1 controller 1041.1, or is indirectly transmitted through a system memory 102. The data is transmitted between the channels until power supplied to the channel 1 controller 1041.1 is cut off.

If the amount of the processed data exceeds the predetermined value after the channel 1 is inactivated, the graphic core 1042 recovers the reduced channel 1 (or reduced channels according to other embodiments having more than two channels) to reuse the inactivated channel 1. In this case, the graphic core 1042 controls the logic power 1043 to supply power back to the channel 1 controller 1041.1. Furthermore, the graphic core 1042 controls the channel 0 controller 1041.0 and the channel 1 controller 1041.1 to distribute a portion of the data of the channel 0 to the channel 1. Thus, a portion of the data is divided from the data stored in the graphic memory channel 0 103.0, is allocated with memory addresses of the graphic memory channel 1 103.1, and is moved to the graphic memory channel 1 103.1.

According to another embodiment of the present invention, the computer system 100 further includes a power control IC 105 to supply power to the graphic memory channel 0 103.0 and the graphic memory channel 1 103.1. The graphic core 1042 controls the power control IC 105 to not supply power to the graphic memory channel 1 103.1 when the channel 1 is inactivated. Thus, unnecessary power consumption due to the unused memory may be minimized. Similarly, the graphic core 1042 controls the power control IC 105 to supply power back to the graphic memory channel 1 103.1 if the channel 1 is restored. The power control IC 105 is an example of a second power supply unit according to aspects of the present invention. However, it is understood that aspects of the present invention are not limited thereto. For example, power distribution may be controlled using one or more switches, and/or by using a single power supply unit.

With regard to an expansion of physical memory according to another embodiment of the present invention, the address of the memory of a channel among the plurality of channels may be expanded while the number of the channels is fixed.

Figure 2:
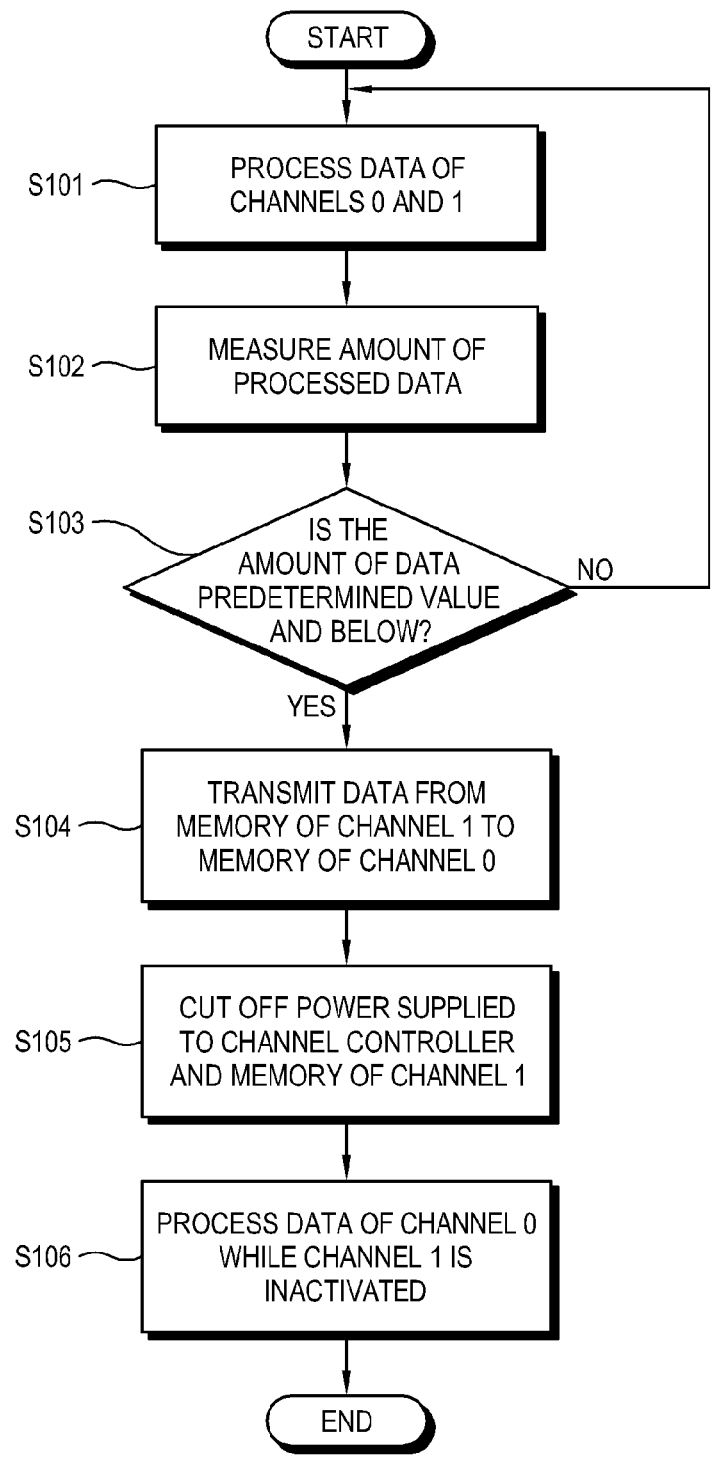
FIG. 2 is a flowchart to describe a control method of a computer system according to an embodiment of the present invention.

FIG. 2 is a flowchart to describe a control method of the computer system 100 according to an embodiment of the present invention. More specifically, FIG. 2 illustrates an example of reducing the channels. Hereinafter, repetitive or similar descriptions of the computer system 100 described with reference to FIG. 1 will be omitted.

Referring to FIGS. 1 and 2, data is processed by the two memories (graphic memory channel 0 103.0 and graphic memory channel 1 103.1) corresponding to the channels 0 and 1. The amount of data processed in operation S101 is measured in operation S102.

If it is determined in operation S103 that the amount of the data that is processed is greater than a predetermined value, the operations S101 and 102 are repeatedly performed.

Conversely, if it is determined in operation S103 that the amount of the data is less than or equal to the predetermined value, the data stored in the memory 103.1 of the channel 1 is allocated with the memory address of the channel 0 and transmitted to the memory 103.0 of the channel 0 in operation S104.

Power that is supplied to the channel controller (channel 1 controller 1041.1) and the memory 103.1 of the channel 1 is cut off in operation S105. Accordingly, the data is processed by the channel 0 while the channel 1 is inactivated in operation S106.

Figure 3:
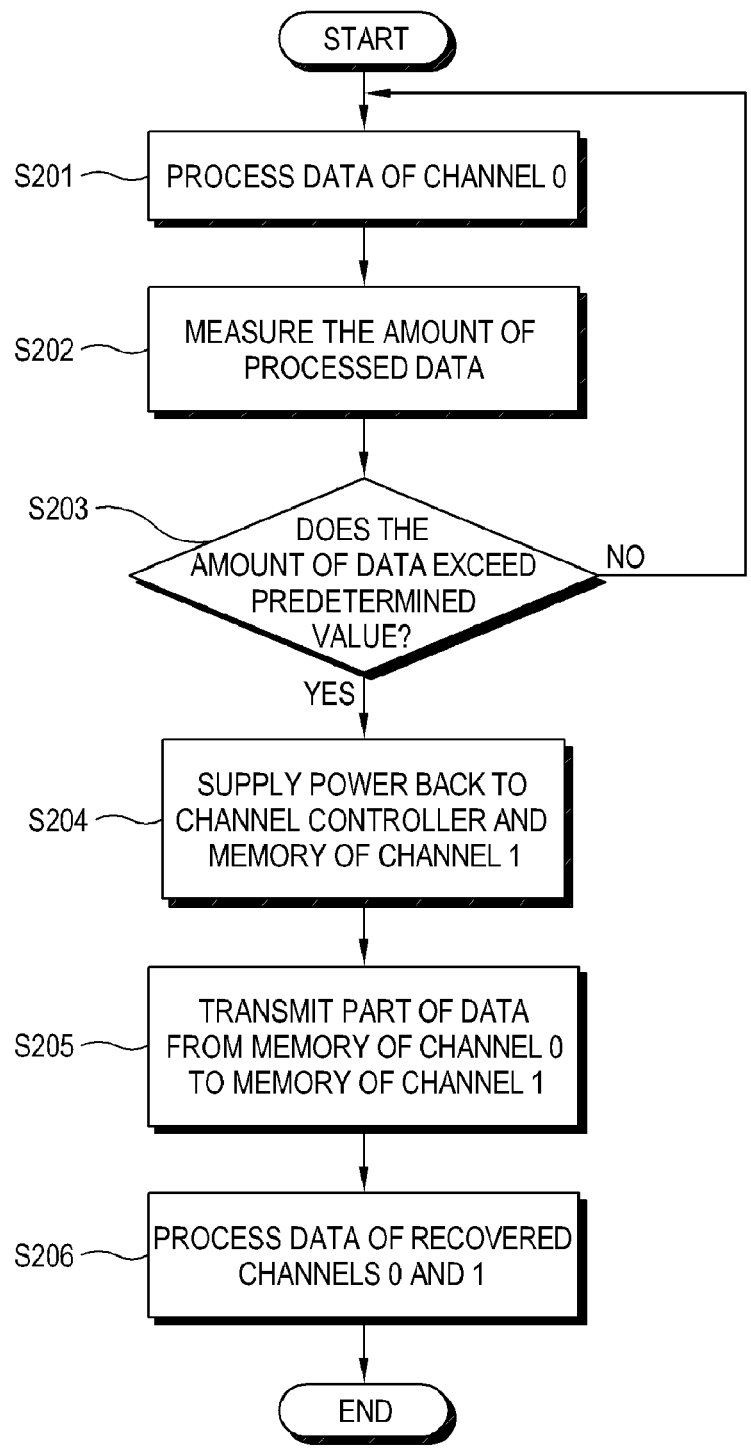
FIG. 3 is a flowchart to describe a control method of a computer system according to another embodiment of the present invention.

FIG. 3 is a flowchart to describe a control method of the computer system 100 according to another embodiment of the present invention. Specifically, FIG. 3 illustrates an example of recovering one or more reduced channels. Hereinafter, repetitive and similar descriptions of the computer system 100 described with reference to FIG. 1 will be omitted.

Referring to FIGS. 1 and 3, data is processed by the memory 103.0 corresponding to the channel 0 while the channel 1 is inactivated in operation S201. The amount of data processed in operation S201 is measured in operation S202.

If it is determined in operation S203 that the amount of data measured in operation S202 does not exceed a predetermined value, the operations S201 and 202 are repeatedly performed.

Conversely, if it is determined in operation S203 that the amount of data measured in operation S202 exceeds the predetermined value, power is supplied back to the channel controller and the memory 103.1 of the channel 1 in operation S204.

The portion of data divided from the channel 0 is allocated with the memory address of the channel 1 and transmitted to the memory 103.1 of the channel 1 in operation S205. Then, in operation S206, the data of the recovered channels 0 and 1 is processed.

According to the present embodiment, the bandwidth of the memory channels totals 128 bits including two 64-bit channels. However, it is understood that aspects of the present invention are not limited thereto. For example, four 32-bit channels may be used. In this case, the overall memory channels may be reduced to 32 bits or 64 bits or expanded to 64 bits or 128 bits.

Aspects of the present invention may be applicable to a data processing apparatus (such as a graphic chip) as well as the computer system 100. The data processing apparatus according to aspects of the present invention may have an equivalent or similar configuration to the graphic memory controller 104 described in reference to FIG. 1.

As described above, aspects of the present invention provide a computer system that minimizes power consumption used to process data of a plurality of channels, a control method thereof and a data processing apparatus.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system, comprising:
    a first memory corresponding to a first channel to store data and a second memory corresponding to a second channel, to store data;
    a data processor to process the data of the first channel and the second channel; and
    a controller to inactivate the second channel if an amount of the data, of the first channel and the second channel, processed by the data processor is less than or equal to a predetermined value,
    wherein the data processor does not write the data to the second channel when the controller inactivates the second channel.

2. The computer system as claimed in claim 1, wherein the data processor processes the data of the first channel and the second channel in a time division manner.

3. The computer system as claimed in claim 1, wherein the controller transmits the data of the second channel to the first memory when the second channel is inactivated.

4. The computer system as claimed in claim 1, further comprising:
    a first channel controller corresponding to the first channel to provide an interface between the first memory and the data processor;
    a second channel controller corresponding to the second channel to provide an interface between the second memory and the data processor; and
    a power supply unit to supply power to the first channel controller and the second channel controller,
    wherein the controller controls the power supply unit to not supply power to the second channel controller when the second channel is inactivated.

5. The computer system as claimed in claim 4, further comprising another power supply unit to supply power to the first memory and the second memory,
    wherein the controller controls the other power supply unit to not supply power to the second memory when the second channel is inactivated.

6. The computer system as claimed in claim 4, wherein:
    the power supply unit supplies power to the first memory and the second memory; and
    the controller controls the power supply unit to not supply power to the second memory when the second channel is inactivated.

7. The computer system as claimed in claim 1, wherein the controller recovers the second channel if the amount of the data of the first channel processed by the data processor is greater than the predetermined value.

8. The computer system as claimed in claim 7, wherein the controller transmits a portion of the data from the first memory to the second memory when the second channel is recovered.

9. The computer system as claimed in claim 7, further comprising:
    a first channel controller corresponding to the first channel to provide an interface between the first memory and the data processor;
    a second channel controller corresponding to the second channel to provide an interface between the second memory and the data processor; and
    a power supply unit to supply power to the first channel controller and the second channel controller, wherein the controller controls the power supply unit to not supply power to the second channel controller when the second channel is inactivated, and to supply the power back to the second channel controller when the second channel is recovered.

10. The computer system as claimed in claim 7, further comprising another power supply unit to supply power to the first memory and the second memory, wherein the controller controls the other power supply unit to not supply power to the second memory when the second channel is inactivated, and to supply the power back to the second memory when the second channel is recovered.

11. The computer system as claimed in claim 9, wherein: the power supply unit supplies power to the first memory and the second memory; and the controller controls the power supply unit to not supply power to the second memory when the second channel is inactivated, and to supply the power back to the second memory when the second channel is recovered.

12. The computer system as claimed in claim 1, wherein the first memory and the second memory are graphics memories, and the data is graphics data.

13. A control method of a computer system, the control method comprising:

measuring an amount of processed data of a first channel corresponding to a first memory that stores data, and a second channel corresponding to a second memory that stores data; and inactivating the second channel if the amount of the processed data of the first channel and the second channel is less than or equal to a predetermined value.

14. The control method as claimed in claim 13, wherein the processed data of the first channel and the second channel is processed in a time division manner.

15. The control method as claimed in claim 13, wherein the inactivating the second channel comprises transmitting the data of the second channel to the first memory.

16. The control method as claimed in claim 13, wherein the inactivating of the second channel comprises cutting off power supplied to a second channel controller that controls data transmission of the second channel.

17. The control method as claimed in claim 16, wherein the inactivating of the second channel further comprises cutting off power supplied to the second memory.

18. The control method as claimed in claim 13, further comprising:

measuring an amount of processed data of the first channel after the inactivating of the second channel; and recovering the second channel if the amount of the processed data is greater than the predetermined value.

19. The control method as claimed in claim 18, wherein the recovering the second channel comprises transmitting a portion of the data from the first memory to the second memory.

20. The control method as claimed in claim 18, wherein:
the inactivating of the second channel comprises cutting off power supplied to a second channel controller that controls data transmission of the second channel; and the recovering of the second channel comprises supplying the power back to the second channel controller.

21. The control method as claimed in claim 18, wherein:
the inactivating of the second channel comprises cutting off power supplied to the second memory; and the recovering of the second channel comprises supplying the power back to the second memory.

22. The control method as claimed in claim 15, wherein the transmitting of the data of the second channel to the first memory comprises allocating a memory address of the first memory to the data of the second channel.

23. The control method as claimed in claim 15, wherein the transmitting of the data of the second channel to the first memory comprises:

transmitting the data of the second channel from the second memory to a system memory; and transmitting the data of the second channel from the system memory to the first memory.

24. The control method as claimed in claim 13, wherein the first memory and the second memory are graphics memories, and the data is graphics data.

25. A computer readable recording medium encoded with the method of claim 13 and implemented by a computer.

26. A data processing apparatus, comprising:
a data processor to process data of a first channel corresponding to a first memory and a second channel corresponding to a second memory; and a controller to inactivate the second channel if an amount of the data, of the first channel and the second channel, processed by the data processor is less than or equal to a predetermined value.

27. The data processing apparatus as claimed in claim 26, wherein the data processor processes the data of the first channel and the second channel in a time division manner.

28. The data processing apparatus as claimed in claim 26, wherein the controller inactivates the second channel by cutting off a supply of power to the second memory and/or a second channel controller that provides an interface between the second memory and the data processor.

29. The data processing apparatus as claimed in claim 26, wherein the first memory and the second memory are graphics memories, and the data is graphics data.

30. A method of controlling a power supply in a computer system including a first memory corresponding to a first channel and a second memory corresponding to a second channel, the method comprising:

cutting off a power of the second channel if an amount of data, of the first and second channels, that is processed is less than or equal to a predetermined value.

* * * * *